United States Patent [19]

Svensson

[11] Patent Number: 4,974,988
[45] Date of Patent: Dec. 4, 1990

[54] METHOD AND A DEVICE TO PREVENT RELATIVE DISPLACEMENT BETWEEN TWO ELEMENTS

[76] Inventor: Jan-Erik Svensson, Smedjegatan 1, S-568 00 Skillingaryd, Sweden

[21] Appl. No.: 348,497

[22] Filed: Apr. 28, 1989

[30] Foreign Application Priority Data

Oct. 29, 1986 [WO] PCT Int'l Appl. .................... PCT/SE86/00495

[51] Int. Cl.⁵ ............................ B25G 3/00; F16B 9/00
[52] U.S. Cl. .................................. 403/259; 403/319; 403/320; 411/325
[58] Field of Search ........................ 403/259, 319, 320; 411/325, 323, 321

[56] References Cited

U.S. PATENT DOCUMENTS

| 319,791 | 6/1885 | Conway | 411/325 |
| 1,334,977 | 3/1920 | Torazzi et al. | 411/325 |
| 3,455,175 | 7/1969 | DeSmedt et al. | 74/89.15 |

FOREIGN PATENT DOCUMENTS

| 3320444 | 10/1984 | Fed. Rep. of Germany . |
| 79068789 | 8/1979 | Sweden . |
| 143678 | 3/1964 | U.S.S.R. ............................ 403/259 |

Primary Examiner—Andrew V. Kundrat
Attorney, Agent, or Firm—Howson & Howson

[57] ABSTRACT

To prevent relative turning between elements which are to be in threaded engagement with one another, one of the elements is provided with a recess and the other element with a non-circular through hole. When the two elements have been joined and brought into their intended relative positions, a locking element, having a cross-section conforming to the through hole, is inserted through the through hole and forced into the recess, deforming the material surrounding the recess, thereby locking the two elements against relative turning. The locking element can be a part of a tool used to rotate the element having the through hole when the elements are joined together. After the locking element is forced into the recess, the excess portion of the tool, extending beyond the element having the through hole, can be cut off or otherwise removed.

12 Claims, 1 Drawing Sheet

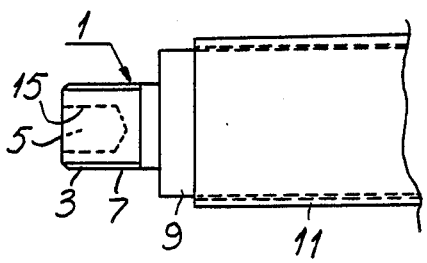
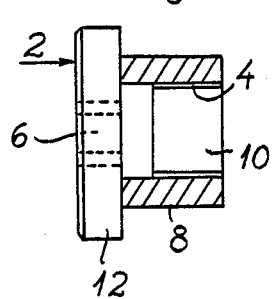
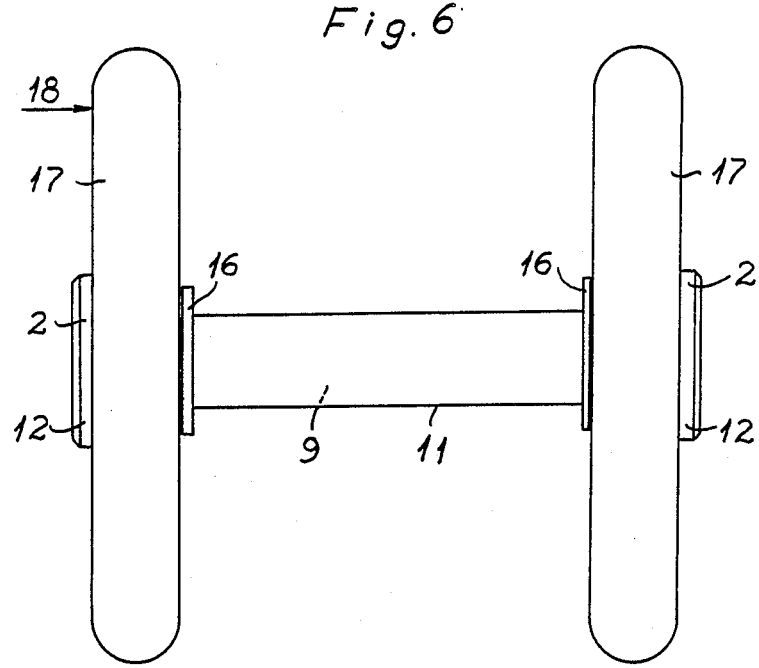
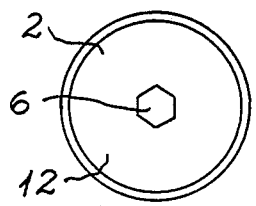
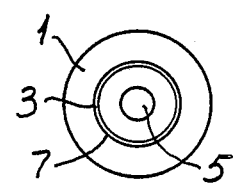

METHOD AND A DEVICE TO PREVENT RELATIVE DISPLACEMENT BETWEEN TWO ELEMENTS

TECHNICAL FIELD

The present invention relates to two-element fasteners and to the prevention of relative displacement between first and second elements of the fastener.

BACKGROUND

There is a need for a new method for insuring secure connection between the elements of a two-element fastener. The elements need to be capable of being locked against turning, relative to each other. Furthermore, it should not be necessary to search for a particular position in which locking can take place. Locking should be possible at any relative rotational relationship of the two fastener elements.

TECHNICAL PROBLEMS

Known lockable fastening devices are complex, both in use and in construction, leading to unnecessarily high costs. Furthermore, prior art connection methods and devices are specifically limited so that the locking between the elements can be effected only when the elements are in discrete relative positions. This limitation often results in products which are substandard or loosely fitting. Further, known lockable fasteners typically have limited uses.

THE SOLUTION

When using the method and device according the invention, the problems of the prior art are solved, while the disadvantages of existing devices and methods are eliminated. The elements of the fastener can be locked in any rotational position, relative to each other. This permits articles to be securely fixed and fastened. AlternatiVely, it permits articles which to be securely connected together while remaining relatively rotatable or movable in a predetermined fashion if desired. Further, the method and the device according to the invention can be used in a number of different applications. The method is easy to use, and the device is simple in its construction. The device can be produced simply and at low cost.

In the preferred embodiment of the invention, the fastener comprises first and second elements engageable by relative rotation, e.g. by threads, and a locking element for securing the first and second elements against rotation. The locking element is axially movable in a through hole formed in the first element, but non-rotatable therein. The locking element is receivable in a recess formed in the second element, which recess is dimensioned so that its wall is deformed by the entry of the locking element. Thus, when the locking element enters the recess, it secures the first and second elements against relative rotation.

The locking element is preferably part of a tool, for example an Allen wrench, used to rotate the first element. After bringing the elements into the intended, relative engagement position, and bringing the locking element into engagement with the recess of the second element, the handle portion of the tool is cut off or otherwise separated from a portion of the tool which remains in place as a locking element to secure the first and second elements in their relative positions.

Of course, the locking element or tool can be formed of separate pegs, taps, or other similar devices. For ease in disassembly of connected articles, the locking element portion of the tool can have provision for engagement with and disengagement from the handle portion of the tool. For example, the locking element portion can have a socket threaded to allow engagement of the handle portion of the tool with the locking element portion.

The device is useful for various purposes, for example, to secure weights on a dumbbell. In one preferred embodiment the second element is the supporting bar for a dumbbell, and the first element is a holding device to secure weights on the supporting bar of the dumbbell. The first element in this embodiment, carries a flange which serves as a stop for the weights at either end of the support bar.

Further characteristics and advantages of the method and the device of the invention will be apparent by reference to the accompanying drawings in light of the following description of the invention.

BRIEF DESCRIPTION OF DRAWINGS

FIG. 1 is a side elevation of a second element according to the presently preferred embodiment of the invention;

FIG. 2 is a side elevation, partly in section, of a first element according to the presently preferred embodiment of the invention;

FIG. 3 is an end view of the second element as seen from the left side of FIG. 1;

FIG. 4 is an end view of the first element as seen from the left side of FIG. 2;

Fig. 5 is a fragmentary elevational view of a tool incorporating a looking element according to the preferred embodiment of the invention; and FIG. 6 is an elevational view of a dumbbell assembled according to the method of the present invention.

BEST MODE FOR CARRYING OUT THE INVENTION

Elements 1 and 2 in FIGS. 1 and 2 are respectively a second element and a first element which are to be connected to each other and locked against relative displacement. Elements 1 and 2 can be used to connect articles such as bar 9 and weight 17 (FIG. 3), with the weight arranged between the first and second elements before they are joined together. The second element 1 has a journal 7 with external threads 3 and the first element 2 has a cylinder 8 having a bore 10 with internal threads 4. The first element 2 is provided with an axial through hole 6 and the second element 1, is provided with a recess 5.

The second element 1 has a handle 9 and a sleeve 11 which is rotatably arranged on handle 9 to form the grasping portion of a dumbbell 18 as shown in FIG. 6. The first element 2 has a cylinder 8 with a flange 12 through which hole 6 extends. Hole 6 permits a tool, as shown in Fig. 5, to pass through the element 2 in order to engage recess 5 of element 1.

As shown in FIG. 3, recess 5 has a circular cross-section. As shown in FIG. 4, through hole 6 has a cross-sectional shape and dimensions differing from those of recess 5. Through hole 6 can have a hexagonal cross-section, for example to receive an Allen wrench such as shown in Fig. 5. Recess 5 is formed with a maximum radial dimension, relative to its axis, smaller than the maximum radial dimension of opening 6 relative to the same axis.

Elements 1 and 2 are connected together by engagement of threads 3 and 4. This is accomplished by rotating element 2 by means of the tool of FIG. 5, which is non-rotatably engaged i.e. in splined relationship, with hole 6 in element 2. The tool is axially displaceable in opening 6 in a direction toward second element 1 so that it is capable of introduction into recess 5.

In Figure 5, a combination tool and locking element is shown. The tool has a hexagonal cross-section which conforms to hole 6 in element 2 and can be used to rotate element 2 relative to element 1 when these elements are brought into engagement with one another. It is contemplated that a variety of differently-shaped tools can be used with correspondingly shaped openings in element 2.

As shown in FIG. 5, the tool has a locking element portion 13 and a handle portion 14, both formed as a unit and separable only by cutting. Alternatively, the locking element portion 13 can be made separable from the handle portion and reengageable therewith for future dismantling of the fastener. When the tool is used also as a locking element, handle portion 14 of the tool can be cut off after it has been used to join elements 1 and 2 together, leaving the end portion 13 of the tool to serve as the locking element. The separation or cutting off of the end portion 13 of the tool is carried out after the locking element 13 is moved axially in opening 6 and pushed into recess 5 of element 1. Alternatively the tool can be taken out and replaced by a different locking element which is pushed through the opening 6 and into recess 5.

In either case, the locking element 13 deforms or cuts the material 15 surrounding recess 5. This is accomplished by hitting or striking the free end of the locking element with sufficient force that the locking element 13 can be displaced into the recess 5. To enable the locking element to cut or deform the material surrounding the recess, the locking element consists of a harder material than the material surrounding the recess. For example, the tool can be made of tempered steel, if the second element 1 consists of metal.

The method and device according to the invention are illustrated in the context of a dumbbell 18. In a dumbbell it is difficult to keep a nut or similar holding device in its intended position. It is possible that the holding device will become disengaged with the result that the weights 17 fall off the dumbbell and possibly damage fittings or injure the person wielding the dumbbell. The method and locking device in accordance with the invention insure that the weights remain on the supporting bar 9 of the dumbbell 18. The fastener of the invention allows the weights to be borne loosely or rotatably on the supporting bar, yet prevents accidental disengagement. Washers 16 are arranged on the bar 9 as counter-flanges. A washer 16 can rest against a shoulder of the supporting bar or against sleeve 11 which is rotatably arranged on the bar.

Within the scope of this invention, various modifications and alternative applications of the method and device are possible. For example, the invention is applicable for connection of a piston and a piston rod in a piston engine, a hydraulic piston and rod in a hydraulic cylinder, and for making various different holding or locking connections. Modifications, such as the use of alternatives to threads 3 and 4, can be made without departing from the scope of the invention as defined in the following claims.

I claim:

1. A method for connecting first and second elements to each other and locking the elements against relative displacement comprising the steps of:
    rotating the first element relative to the second element about an axis of rotation, thereby effecting engagement of the elements; and
    thereafter forcing a locking element through an axial through hole in the first element into a recess in the second element, while the locking element remains in non-rotating engagement with the first element, and thereby displacing material of the second element whereby the locking element becomes non-rotatably engaged with the second element.

2. A method according to claim 1 which the locking element is a part of a tool, and in which the step of rotating the first element relative to the second element is effected by insertion of the tool into the axial through hole and rotating the tool.

3. A method according to claim 1 in which the locking element is a part of a tool, in which the step of rotating the first element relative to the second element is effected by insertion of the tool into the axial through hole and rotating the tool, end including the step of separating a portion of the tool extending outwardly from the through hole on the side of the first element remote from the recess of the second element.

4. A method according to claim 1 in which the locking element is in splined relationship with the through hole in the first element.

5. A method according to claim 1 in which the portion of the looking element which enters the recess in the second element has a maximum radial dimension relative to said axis which is greater than the maximum radial dimension of the recess relative to said axis, whereby the step of forcing the locking element into the recess effects displacement of material of the second element for any relative rotational relationship of the locking element and the second element.

6. A method according to claim 1 in which the locking element consists of a material having a hardness greater than the hardness of the material forming the wall of the recess of the second element.

7. A method for connecting first and second threaded elements to each other and locking the elements against relative displacement comprising the steps of:
    rotating the first element relative to the second element about an axis of rotation, thereby effecting threading engagement of the elements by rotating a tool extending into a non-circular through hole in the first element, the tool having a cross-sectional shape such that it cannot be rotated relative to the first element when extending into the non-circular through hole; and
    thereafter forcing the tool axially into a recess in the second element while the tool remains in nonrotating engagement with the first element, and thereby displacing material of the second element whereby the tool becomes non-rotatably engaged with the second element.

8. A fastener comprising:
    first and second elements having cooperating means for causing the elements to become engaged with each other by relative rotation of the elements about an axis;

means providing a through hole in the first element extending along said axis;

a recess in the second element also extending along said axis; and a locking element extendible through said hole in the first element in splined relationship with said first element whereby the locking element can move axially relative to the first element, but the first element is prevented from rotating relative to the locking element;

wherein the locking element has a maximum radial dimension relative to said axis which is greater than the maximum radial dimension of the recess relative to said axis, whereby, if the locking element is forced axially into the recess displacement of material of the second element occurs for any relative rotational relationship of the locking element and the second element.

9. A fastener according to claim 8 in which the locking element consists of a material having a hardness greater than the hardness of the material forming the wall of the recess of the second element.

10. A fastener according to claim 8 including tool means extendible through the hole in the first element and having a portion extending outwardly from the hole in the first element whereby rotation of the first element relative to the second element can be effected by rotating said portion of the tool means, and wherein said locking element is a part of said tool means.

11. A fastener according to claim 8 in which the hole in said first element and said locking element have conforming polygonal cross-sections.

12. A fastener according to claim 8 in which the recess in the second element has a circular cross-section.

* * * * *